US010837419B2

(12) United States Patent
Droche

(10) Patent No.: US 10,837,419 B2
(45) Date of Patent: Nov. 17, 2020

(54) ROTOR FOR A DEVICE FOR RECOVERING HYDRAULIC WAVE ENERGY

(71) Applicant: Emile Droche, Colombes (FR)

(72) Inventor: Emile Droche, Colombes (FR)

(*) Notice: Subject to any disclaimer, the term of this patent is extended or adjusted under 35 U.S.C. 154(b) by 0 days.

(21) Appl. No.: 16/651,111

(22) PCT Filed: Sep. 27, 2018

(86) PCT No.: PCT/EP2018/076330
§ 371 (c)(1),
(2) Date: Mar. 26, 2020

(87) PCT Pub. No.: WO2019/063724
PCT Pub. Date: Apr. 4, 2019

(65) Prior Publication Data
US 2020/0224631 A1    Jul. 16, 2020

(30) Foreign Application Priority Data

Sep. 27, 2017 (FR) ..................................... 17 58970

(51) Int. Cl.
*F03B 3/12* (2006.01)
*F03B 13/14* (2006.01)

(52) U.S. Cl.
CPC ............... *F03B 3/12* (2013.01); *F03B 13/14* (2013.01)

(58) Field of Classification Search
CPC .................................. F03B 3/12; F03B 13/14
USPC ......... 290/43, 44, 53, 55; 416/41, 51, 132 R
See application file for complete search history.

(56) References Cited

U.S. PATENT DOCUMENTS

| 178,507 | A | * | 6/1876 | Burrows | ................ | F03D 7/041 |
| | | | | | | 416/41 |
| 243,169 | A | * | 6/1881 | Sprague | ................ | F04D 29/382 |
| | | | | | | 416/132 R |
| 835,667 | A | * | 11/1906 | Donnelly | ............. | F04D 29/382 |
| | | | | | | 416/132 R |
| 1,334,485 | A | * | 3/1920 | Clipfell | ................ | F03D 7/0224 |
| | | | | | | 290/55 |
| 1,461,048 | A | * | 7/1923 | Roman | ................ | F03D 7/0224 |
| | | | | | | 416/51 |
| 3,504,990 | A | * | 4/1970 | Sugden | ................... | B63H 1/16 |
| | | | | | | 416/176 |

(Continued)

FOREIGN PATENT DOCUMENTS

| DE | 102010011708 A1 | 9/2011 |
| EP | 2177749 A2 | 4/2010 |

(Continued)

OTHER PUBLICATIONS

International Search Report, PCT/EP2018/076330, dated Oct. 31, 2018.

*Primary Examiner* — Pedro J Cuevas
(74) *Attorney, Agent, or Firm* — Fishman Stewart PLLC

(57) ABSTRACT

A device for recovering hydraulic energy of a swell includes a casing and a rotor. In embodiments, a rotor of the device for recovering the hydraulic energy of the swell includes a rim, a hub mounted inside the rim and secure with the rim, and a blade extending radially between the hub and the rim. The blade may be deformable under the pressure effect of the liquid medium flow and the rotor may include a holding means configured to hold the blade in a first deformed configuration for a liquid medium flow in a first direction.

32 Claims, 7 Drawing Sheets

(56) References Cited

U.S. PATENT DOCUMENTS

| | | | | |
|---|---|---|---|---|
| 3,912,937 A * | 10/1975 | Lesser | | F03B 17/065 290/43 |
| 3,995,170 A * | 11/1976 | Graybill | | F03D 3/067 290/55 |
| 4,003,676 A * | 1/1977 | Sweeney | | F03D 7/0224 416/132 B |
| 4,111,601 A * | 9/1978 | Richard | | F03D 7/0252 416/41 |
| 4,150,301 A * | 4/1979 | Bergey, Jr. | | F03D 9/25 290/44 |
| 4,289,970 A * | 9/1981 | Deibert | | F03D 9/25 290/44 |
| 4,319,865 A * | 3/1982 | Richard | | F03D 7/0224 416/41 |
| 4,330,714 A * | 5/1982 | Smith | | F03D 1/0608 290/55 |
| 4,350,895 A * | 9/1982 | Cook | | F03D 15/10 290/55 |
| 4,720,640 A * | 1/1988 | Anderson | | F03D 13/20 290/43 |
| 5,269,656 A * | 12/1993 | Maga | | F04D 29/181 416/189 |
| 6,064,123 A * | 5/2000 | Gislason | | F03D 9/25 290/55 |
| 7,190,087 B2 * | 3/2007 | Williams | | F03B 13/264 290/53 |
| 7,323,792 B2 * | 1/2008 | Sohn | | F03D 1/0666 290/55 |
| 7,775,760 B1 * | 8/2010 | Finnell | | F03D 1/0658 415/4.3 |
| 7,825,532 B1 * | 11/2010 | Barber | | F03D 9/25 290/55 |
| 8,109,727 B2 * | 2/2012 | Barber | | F03D 7/0236 416/132 B |
| 8,134,251 B2 * | 3/2012 | Barber | | F03D 1/0608 290/55 |
| 8,164,212 B2 * | 4/2012 | Barber | | F03D 9/25 290/55 |
| 8,174,142 B2 * | 5/2012 | Barber | | F03D 1/0608 290/55 |
| 8,258,645 B2 * | 9/2012 | Barber | | F03D 1/0608 290/55 |
| 8,668,455 B2 * | 3/2014 | Finnell | | F03D 7/0228 416/132 B |
| 8,674,538 B2 * | 3/2014 | Lugg | | F03D 1/0666 290/55 |
| 8,915,717 B2 * | 12/2014 | Stephan | | F04D 29/666 416/228 |
| 8,956,114 B2 | 2/2015 | Arlitt et al. | | |
| 8,974,199 B2 * | 3/2015 | Schmid | | F04D 29/662 417/423.7 |
| 10,233,892 B2 | 3/2019 | Duchene et al. | | |
| 10,233,904 B2 * | 3/2019 | Barber | | F03D 9/30 |
| 10,435,145 B1 * | 10/2019 | Finnell | | B64C 27/473 |
| 10,443,569 B1 * | 10/2019 | Finnell | | F03D 7/028 |
| 10,605,269 B2 * | 3/2020 | Stadler | | F04D 29/328 |
| 2006/0131890 A1 * | 6/2006 | Gizara | | F03B 17/065 290/43 |
| 2009/0096217 A1 * | 4/2009 | Watson | | F03D 13/25 290/55 |
| 2010/0264661 A1 * | 10/2010 | Barber | | H02K 7/08 290/55 |
| 2010/0264662 A1 * | 10/2010 | Barber | | F03D 7/0224 290/55 |
| 2010/0264663 A1 * | 10/2010 | Barber | | F03D 13/20 290/55 |
| 2010/0264667 A1 * | 10/2010 | Barber | | H02K 7/08 290/55 |
| 2010/0266407 A1 * | 10/2010 | Barber | | F03D 1/0608 416/85 |
| 2010/0266412 A1 * | 10/2010 | Barber | | F03D 1/0666 416/147 |
| 2011/0012363 A1 * | 1/2011 | Finnell | | F03D 1/0608 290/55 |
| 2011/0031760 A1 * | 2/2011 | Lugg | | H02K 7/1869 290/55 |
| 2011/0068729 A1 * | 3/2011 | Barber | | H02K 7/1869 318/538 |
| 2011/0229322 A1 * | 9/2011 | Tadayon | | F03D 1/065 416/91 |
| 2012/0124986 A1 * | 5/2012 | Carter | | F03B 13/22 60/398 |
| 2012/0134815 A1 * | 5/2012 | Carroll | | F03D 1/0675 416/23 |
| 2012/0177515 A1 * | 7/2012 | Schmid | | F04D 29/662 417/423.14 |
| 2012/0207606 A1 * | 8/2012 | Stephan | | F04D 29/164 416/204 R |
| 2015/0219068 A1 * | 8/2015 | Port | | F03D 9/25 290/39 |
| 2016/0265556 A1 * | 9/2016 | Stadler | | F04D 29/328 |

FOREIGN PATENT DOCUMENTS

| | | |
|---|---|---|
| EP | 2620634 A2 | 7/2013 |
| FR | 3009032 A1 | 1/2015 |
| GB | 1447758 A | 9/1976 |
| JP | S6126167 A | 2/1986 |

\* cited by examiner

ROTOR FOR A DEVICE FOR RECOVERING HYDRAULIC WAVE ENERGY

CROSS-REFERENCE TO RELATED APPLICATIONS

This application is a National Stage patent application of International Patent Application No. PCT/EP2018/076330, filed Sep. 27, 2018, which claims the benefit of French Application Serial No. 17 58970, filed Sep. 27, 2017, the contents of each are incorporated by reference in their entireties.

TECHNICAL FIELD

The invention lies in the field of the recovery of the hydraulic energy of the swell and, more precisely, in the field of the recovery of this energy by a device comprising a housing and a rotor converting a flow of fluid passing through it into a rotary movement. It relates to a device for recovering hydraulic energy from the swell, its rotor and a field of such devices.

BACKGROUND

The invention has particular application in the marine environment but more generally applies to any liquid medium in which the swell is likely to occur.

The swell is an undulating movement of a liquid medium. It is a type of non-breaking wave. Due to its presence in certain environments, particularly at sea, it has been envisaged to recover the energy associated with this undulating movement to convert it into electrical energy. For example, application FR3009032A1 describes a device for converting a translational motion of a structure with respect to a fluid into a rotary motion of the structure. The structure comprises a shaft and one or more flexible flaps secured to the shaft by transverse arms. The flexible flaps make it possible to keep the same direction of rotation for an alternating vertical translational motion. A disadvantage of this device is that it provides no control of the bending of the flaps. These bend according to the force applied on their surface, which, by reciprocity, causes strong drag, this force depending on the properties of the flow of the liquid medium. The material constituting the flaps and their dimensions must then be best determined so that the bending of the flaps is adapted to the local swell conditions. Moreover, as these conditions vary over time, the energy conversion device cannot provide optimum efficiency throughout the year or even during one wave cycle. The motion conversion device also has the disadvantage that the transverse arms generate significant drag because they work only in bending and therefore require a large cross-section to bear the forces applied to the flaps and transmitted to the shaft. Yet another disadvantage is that the flaps do not have the typical twisted shape of a blade, i.e. with a larger inclination closer to the hub and decreasing away from the hub. Such twisting makes it possible to take into account the increase in the tangential linear speed of the various cross-sections of the blade with moving increasingly further away from the axis of rotation in order to maintain, according to the speed triangle rule, a relative speed of the flow in relation to the blade which is constant over the entire surface thereof. This constancy avoids the appearance of radial parasitic flows on the surface of the blade which generate significant efficiency losses.

The document GB1447758A describes a device for recovering swell energy comprising a rotor with pivoting flaps. In this device, the angular deflection of the flaps is limited by the presence of mechanical abutments installed on either side of each flap. However, the performance of the conversion of the translational motion of the liquid medium into a rotary motion of the rotor remains limited. Indeed, the flaps have a substantially flat, non-helical surface, and therefore do not make it possible to obtain a relative speed of the liquid medium which is constant over the entire diameter of the rotor. Moreover, as the tilt of the flaps is defined by fixed abutments, it is not capable of changing according to the speed of the liquid medium flow.

It should also be noted that, in the devices described in documents FR3009032A1 and GB1447758A, the flaps are not protected against the horizontal components of the swell and marine currents. Similarly, these devices provide no sealing at the radial inner edges and radial outer edges of the flaps. It is known that in the case of blades, i.e. elements with twisted shape, the lack of sealing at the outer edges causes a loss of efficiency of around 20%. For non-twisted flaps, the loss of efficiency is even greater. On the other hand, the flaps do not extend from the hub. But the efficiency of a propeller depends greatly on the ratio between the projected surface area of these blades and the cross-section of the propeller.

Given the above, the object of the invention is to provide a device for recovering hydraulic energy from swell with high energy efficiency. The invention also aims to improve the life of the device, especially by eliminating the mechanical articulations between two parts and by protecting against overloads, and facilitating maintenance operations. The invention also aims to provide a device whose costs of design, manufacturing and maintenance are compatible with use on an industrial scale.

SUMMARY

To this end, the invention proposes a rotor comprising one or more deformable blades and means for controlling the deformation of each blade during the passage of a fluid flow through the rotor.

More specifically, the object of the invention is a rotor for a device for recovering the hydraulic energy of swell occurring in a liquid medium, the rotor comprising a rim, a hub mounted inside the rim and secured to the rim and at least one blade extending radially between the hub and the rim. The blade is deformable under the effect of the flow of the liquid medium and the rotor comprises holding means arranged to hold the blade in a first deformed configuration for the flow of the liquid medium in a first direction.

Thus, in operational configuration, i.e. during the passage of a flow of the liquid medium through the rotor, the blade is in a deformed configuration. It is formed to a predetermined shape, this shape being able to be optimised in relation to the properties of the swell. In particular, the liquid medium can have a relative speed in relation to the blade which is uniform over the entire surface of the blade, as recommended by the speed triangle method.

The rotor is designed to be mounted in rotation in relation to a frame of the device for recovering the hydraulic energy of swell along an axis of rotation, called the "rotor axis of rotation". The first direction can for example have an orientation parallel to this axis of rotation. A second direction can be defined as having an identical orientation but an opposite direction.

The holding means can in particular comprise a surface on which part of the blade can be supported. The holding means then forms an end abutment element.

The blade typically comprises a leading edge and a trailing edge each extending radially between the hub and the rim.

According to a particular realisation, the holding means is arranged so as to hold the trailing edge of the blade. The holding means comprises for example a surface on which the trailing edge of the blade can be supported.

The blade also typically comprises an outer edge and an inner edge. Outer edge means a zone of the blade located radially towards the outside, near the rim. Inner edge means a zone of the blade located radially towards the inside, near the hub.

Still according to one realisation, compatible with the preceding ones, the holding means comprises a support surface formed on the rim so that the outer edge of the blade is arranged to press on it during the deformation of the blade in the first deformed configuration.

Instead of or in addition to the support surface formed on the rim, the holding means may comprise a support surface formed on the hub so that the inner edge of the blade is arranged to press on it during the deformation of the blade in the first deformed configuration.

Advantageously the holding means is arranged so that the blade has a helical slope increasing as it approaches the trailing edge. In particular, the support surface formed on the rim and the support surface formed on the hub can be arranged so as to obtain this local increase of the helical slope, i.e. a convex shape.

The holding means is also advantageously arranged so that the blade is twisted in the first deformed configuration. In particular, the support surface formed on the rim and the support surface formed on the hub can be arranged so that the blade is twisted in the first deformed configuration, i.e. while its inner edge and its outer edge are respectively supported on the support surface formed on the hub and the support surface formed on the rim. The blade then forms a helical portion. Such a shape respects the speed triangle and limits radial flows. This helical shape can be modified with an increasing helical slope as it approaches the trailing edge ("convex" shape), which limits the pressure above the following blade and the counter-flow of the fluid leaving a blade and reaching the leading edge of the following blade, the invention making it possible to have a large projected surface area ratio of the blades on the cross-section of the rotor, this ratio being important for blades very close one to the other. This shape also then makes it possible to leave sufficient space for the fluid, as defined by Betz.

The holding means can have the shape of one or more recesses and/or one or more protrusions formed on the hub and/or on the rim. In particular, the holding means comprises for example a recess formed on the hub and/or a recess formed on the rim. The holding means can further comprise a protrusion formed on the hub and/or a protrusion formed on the rim. In an economic realisation, the holding means is constituted by one or more brackets.

Each recess and each protrusion can extend circumferentially so that the entire inner edge or the entire outer edge of the blade is able to found thereupon in the first deformed configuration.

According to a particular realisation, the rim comprises a rim body and a removable wall. The rim body comprises an opening enabling access to the blade and the removable wall is arranged to close the opening. The removable wall thus forms a removable cover enabling in particular an operator to access the blade for maintenance operations.

In this particular realisation, the removable wall can be used to produce a support surface. That is a support surface forming an end abutment element can be formed on the removable wall. Thus, the deformation of the blade can be modified by replacing only the removable wall, without changing the rim or the rotor assembly.

Advantageously the rim can comprise a discharge opening arranged near the trailing edge of the blade when the blade is in the first deformed configuration.

Preferably, the rim has a height, along the axis of rotation of the rotor, greater than the deflection of the blade along the axis of rotation of the rotor. Thus the rim protects the blade from the horizontal component of the swell and the ocean currents.

The holding means can be arranged such that, in the first deformed configuration, the trailing edge of the blade extends between the hub and the rim in a direction forming an angle less than or equal to 30° with a plane perpendicular to the axis of rotation of the rotor. Preferably, this angle is less than or equal to 15°.

When the trailing edge of the blade forms a non-zero angle with a transverse plane, i.e. a plane perpendicular to the axis of rotation of the rotor, a part of the liquid medium is discharged through the rim following the profile of the trailing edge. This flow generates a force comprising an axial component and a radial component. The radial component then forms a hydrodynamic shield near one longitudinal end of the rotor by limiting the flow of liquid medium towards the rotor coming from outside the rotor downstream thereof. Such an introduction of liquid medium would cause backpressure downstream of the rotor and reduce the performance of the conversion of the translational motion into rotation. On the contrary, with the flow partially discharged radially near the trailing edge, and passing through the discharge opening if this is present, the flow of the external liquid medium attracts downstream the flow downstream of the rotor and thus increases the performance of the device.

The leading edge and the trailing edge can have different orientations in relation to the plane perpendicular to the axis of rotation of the rotor.

The holding means can also be arranged so that the trailing edge of the blade has a convex shape. This results in a limitation of the pressure above the following blade and of the counter current of the fluid leaving a blade and reaching the leading edge of the following blade.

The deformable nature of the blade can be produced using articulations and/or by using a flexible material. Advantageously flexible material is resistant to fatigue in order to be able to go successively from a deformed configuration to a non-deformed configuration multiple times.

The blade comprises for example a sheet, a film or a plate in flexible material. It can in particular comprise a fabric sheet, a nonwoven sheet, a thermoplastic film and/or an elastomer plate. In one realisation, the blade is entirely formed by the elastomer sheet, film or plate. In another realisation, the blade comprises an elastomer plate reinforced with a fabric or nonwoven sheet.

The blade can comprise one or more struts. Such struts are notably useful in the presence of a blade made in a flexible material, so as to limit locally certain deformations. They can also contribute to the transmission of the forces between the blade and the holding means, and thus the hub. The blade can notably comprise one or more radial struts, one or more ortho-radial stiffeners and/or one or more circular arc struts. "Ortho-radial stiffener" means a stiffener extending in a direction perpendicular to a radius of the blade. Preferably, the blade comprises one stiffener at the leading edge. This stiffener is for example fixed at a first end to the hub and at a second end to the rim. The stiffener is then one of the radii of the rotor. Preferably, each radial stiffener is fixed securely at a first end to the hub and at a second end to the rim. A stiffener can be formed of the same or different material to that of the sheet, film or plate. In particular it can be produced in a shape-memory alloy.

When the blade comprises both an elastomer plate and one or more stiffeners, in particular a shape-memory alloy stiffener, the stiffener or stiffeners are preferably embedded in the elastomer plate in order to protect them from the fluid.

The blade can also include one or more articulations extending between the hub and the rim, so as to allow deformation of the blade. In particular, the articulation can introduce a degree of freedom in rotation according to a radius of the blade.

According to a particular realisation, the blade comprises a first peripheral fin extending from the outer edge of the blade and able to be pressed against the rim. Instead of or in addition to this first peripheral fin, the blade can comprise a second peripheral fin extending from an inner edge of the blade and able to be pressed against the hub. Each fin ensures a seal between the blade and the rim or between the blade and the hub. It is preferably made of flexible material. Each fin can have a plurality of tabs joined one to the other to form a continuous fin.

Still according to a particular realisation, the holding means can comprise at least one first magnetic element mounted on the rim or on the hub and at least one second magnetic element mounted on the blade, the magnetic elements being arranged to be able to hold the blade in the first deformed configuration. For example, the first magnetic element comprises an electromagnet and the second magnetic element comprises a permanent magnet. The magnetic elements can thus constitute an electromagnetic protective device in case of overpressure exerted on the blade.

In particular, because of the alternating translational motion of the swell, it is advantageous to be able to control the deformation of the blade in the two directions of circulation of the flow of liquid medium. Thus, preferably, the holding means is also arranged to hold the blade in a second deformed configuration for a flow of the liquid medium in the second direction. All the characteristics of the holding means relative to holding the blade in the first deformed configuration are also applicable for holding the blade in the second deformed configuration. Preferably, the holding means has planar symmetry in relation to a plane perpendicular to the axis of rotation of the rotor, so that the blade has the same symmetry between the first and the second deformed configuration. In particular, the holding means can comprise a first support surface formed on the rim and/or on the hub, on which a part of the blade can be supported when the flow flows in the first direction, and a second support surface formed on the rim and/or on the hub, on which a part of the blade can be supported when the flow flows in the second direction. The first and second support surfaces are thus advantageously symmetrical one to the other in relation to a plane perpendicular to the axis of rotation of the rotor. Similarly, when the rotor includes an electromagnetic protective device, the holding means can comprise at least a third magnetic element mounted on the rim or on the hub and at least a fourth magnetic element mounted on the blade, these magnetic elements being arranged to be able to hold the blade in the second deformed configuration. Of course, by symmetry, the second magnetic element and the fourth magnetic element can be the same element.

According to a particular realisation, the leading edge of the blade is fixed in relation to the hub and to the rim. It is for example fixed at a first end to the hub and at a second end to the rim.

According to another particular realisation, the blade comprises a fixed central zone between the leading edge and the trailing edge of the blade, the fixed central zone extending between the hub and the rim and being integral with the hub and the rim. The leading edge and the trailing edge are both movable in relation to the hub and to the rim. The holding means is arranged so that both the leading edge and the trailing edge of the blade can be held in the first deformed configuration for a flow of the liquid medium in the first direction, and so that both the trailing edge and the leading edge of the blade can be held in the second deformed configuration for a flow of the liquid medium in the second direction.

This realisation has the advantage, compared with a rotor whose leading edge is fixed, of reducing the deflection of the blades to go from a given deformed configuration for one flow direction to a given deformed configuration for the reverse direction of the flow. This results in a reduction in blade wear, a decrease in their fatigue, greater ease of controlling their deformation and greater speed of going from one deformed configuration to another.

In this realisation, the holding means can be arranged so that the leading edge and the trailing edge are reversed at each change of direction of the flow of the liquid medium in the energy recovery device.

The realisation with a fixed central part reverses the direction of rotation of the rotor at each change of phase of the swell. Conversely, a rotor with a fixed leading edge makes it possible to keep the same direction of rotation of the rotor for all phases of the swell. The choice of a rotor with a constant or alternating direction of rotation depends mainly on the driven generator.

In order to optimise, during the same phase of the swell, the shape of the blade to the fluid flow, it is possible to equip the holding means with a deformation control system of the blades allowing the blade to take multiple stable configurations, even a infinite amount.

According to a first branch of the invention, the holding means comprises a set of magnetic elements arranged, on the one hand, on the blade and, on the other hand, on the rim and/or the hub, so as to allow the blade to be held in different configurations. The magnetic elements form all or part of a blade deformation control system capable of completing one or more end abutment elements or completely substituting for any end abutment element.

In a first realisation according to the first branch, the holding means comprises a plurality of magnetic element groups distributed circumferentially, each group comprising a first magnetic element mounted on the blade and a second magnetic element mounted on the rim or the hub, the first magnetic element and the second magnetic element of each group being arranged to interact with each other. For example, the first magnetic elements are permanent magnets and the second magnetic elements are electromagnets. The holding means can comprise the first magnetic element groups whose second magnetic elements are mounted on the rim and the second magnetic element groups whose second magnetic elements are mounted on the hub.

In this first realisation, advantageously each magnetic elements group comprises a third magnetic element mounted on the rim or the hub, the first magnetic element and the third magnetic element being arranged to interact with each other. The third magnetic element can notably be an electromagnet. In a given group, the second and third magnetic elements are preferably arranged symmetrically on the rim or the hub in relation to a plane perpendicular to the axis of rotation of the rotor. These magnetic elements then allow the blade to be held in two configurations symmetrical one with the other or in an infinite amount of positions.

In a second realisation according to the first branch, compatible with the first realisation, the holding means comprises a permanent magnet mounted on the blade and a group of electromagnets mounted on the rim or on the hub, the permanent magnet and the electromagnets being arranged so that the permanent magnet can interact with each electromagnet. Thus, when the group of electromagnets is mounted on the rim, the permanent magnet is preferably mounted near the outer edge of the blade. Conversely, when the group of electromagnets is mounted on the hub, the permanent magnet is preferably mounted near the inner edge of the blade. The permanent magnet can notably be mounted near the trailing edge of the blade. The electromagnets are mounted on the rim or on the hub so that the permanent magnet can be positioned in front of each of them. The electromagnets are thus aligned in a circular arc.

In this second realisation, advantageously the holding means comprises a first group of electromagnets aligned in a circular arc and mounted on the rim, a first permanent magnet mounted on the blade able to interact with each of the electromagnets of the first group, a second group of electromagnets aligned in a circular arc and mounted on the hub and a second permanent magnet mounted on the blade able to interact with each of the electromagnets of the second group. Moreover, the holding means can comprise a plurality of groups of electromagnets mounted on the rim and/or a plurality of groups of electromagnets mounted on the hub, a permanent magnet mounted on the blade being associated with each of these groups.

By controlling the power supply of the electromagnets, it is possible to compel the permanent magnet to approach one of the electromagnets and thus to compel the blade to take a corresponding configuration. The electromagnets can be powered successively so that the blade changes from the first deformed configuration to the second deformed configuration by being successively held in different intermediate configurations. Control of the powering of the electromagnets can be ensured sequentially or gradually. In the case of a sequential power supply, a single electromagnet is powered at a time. In the case of a gradual power supply, a single electromagnet or two neighbouring electromagnets are powered simultaneously by modulating their power supply. In the case of two electromagnets powered simultaneously, the electromagnets can be powered inversely in proportion, so as to gradually move the magnet from one of the electromagnets to the other neighbouring electromagnet.

A rotor according to the first branch under the invention also advantageously comprises a sensor capable of measuring a property of the liquid medium flow and a control device able to control the magnetic elements according to the property of the liquid medium flow. The sensor is for example a speed sensor of the liquid medium flow and/or a pressure sensor. Each sensor can be placed upstream or downstream of the blades. Because of the oscillating nature of the swell, the rotor preferably comprises a pair of sensors arranged on either side of the blades.

According to a second branch of the invention, compatible with the first branch, the holding means comprises at least one end abutment made of shape-memory alloy. The end abutment comprises a first end fixed to the rim or the hub, all or part of the rest of the end abutment being able to act as a support surface for the blade, the end abutment being able to take two stable configurations corresponding to two separate positions of the non-fixed part.

The end abutment in shape-memory alloy end abutment can in particular be heated so as to take the second stable configuration, the end abutment recovering the first stable configuration by cooling. The holding means then comprises means of heating able to heat the end abutment to order.

Advantageously the holding means comprises a first shape-memory end abutment whose first end is fixed on the rim and a second shape-memory alloy end abutment, whose first end is fixed on the hub. Thus the blade can be held both on its outer edge and on its inner edge.

The rotor according to the invention has up to now been presented as comprising a single blade. However, the rotor can of course comprise a plurality of blades, for example two or three, preferably distributed angularly in a regular way.

The invention also relates to a device for recovering the hydraulic energy of the swell occurring in a liquid medium. The recovery device comprises:
  a rotor as described above and
  a casing comprising a through housing arranged to receive the rotor.

The casing has for example an outer surface designed to be immersed in the liquid medium. Preferably the casing has a cylindrical inner surface of revolution, adapted to the diameter of the rotor.

According to a first realisation, the energy recovery device further comprises a float and a cable connecting the casing to the float. The casing is held in dynamic equilibrium between the float and its own weight. The device is arranged so that the float remains on the surface of the liquid medium. If necessary, the casing can optionally be ballasted by a weight. It undergoes the motion of the swell occurring at the float, while being immersed in a liquid medium undergoing a motion of the swell at a greater depth. Because of the difference in amplitude of the vertical component of the swell, the liquid medium passes through the casing such that it drives the rotor in rotation.

According to a second realisation, the energy recovery device further comprises a first cable connecting the casing to the bottom of the liquid medium, a float and a second cable connecting the casing to the float. The first cable can connect the casing to a weight intended to be supported on the bottom. In this realisation, the liquid medium also passes through the casing because of the difference of amplitude of the swell between the float and the casing, the float being nearer to the surface than the casing. Advantageously, the float is held close to the surface but beneath it, which prevents it from being affected by potentially destructive storms. Thus the device is protected from the storms and many other dangers at the surface, such as watercraft. In addition, the device is then invisible and thus does not impair the environment.

The invention also relates to a field of devices for recovering hydraulic energy from the swell. The field of recovery devices comprises a plurality of devices for recovering hydraulic energy from the swell as described above.

Moreover the invention relates to a marine vehicle equipped with a rotor as defined above.

BRIEF DESCRIPTION OF THE DRAWINGS

The invention will be better understood using the description which follows, given only as a non-limiting example, and making reference to the appended drawings, in which.

DETAILED DESCRIPTION

Figure 1:
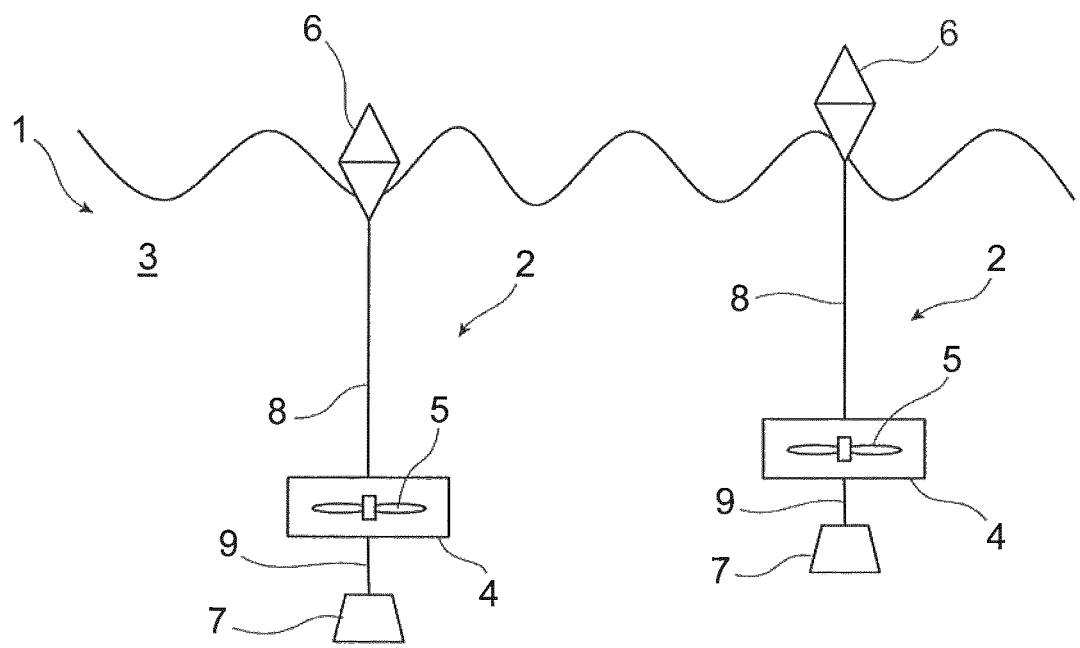
FIG. 1 schematically represents a first example of a field of devices for recovering the hydraulic energy of the swell according to the invention.

FIG. 1 schematically represents a first example of a field of devices for recovering the hydraulic energy of the swell according to the invention. This field 1 comprises two identical recovery devices 2 installed in the water 3 of a marine environment. Each recovery device 2 comprises a casing 4, a rotor 5, a float 6, a weight 7, a first cable 8 and a second cable 9. The casing 4 comprises a through housing in which the rotor 5 is housed. The rotor 5 is mounted by pivoting link in relation to the casing 4 in a vertical axis. The first cable 8 is connected by a first end to the float 6 and by a second end to the casing 4. The second cable 9 is connected by a first end to the casing 4 and by a second end to the weight 7. The float 6 and the weight 7 are designed so that the casing 4 and the rotor 5 are immersed in the water 3 at a depth corresponding to the length of the cable 8 while allowing the float 6 to follow the motion of the swell at the surface of the water. It should be noted that the weight 7 could be fixed securely to the casing 4. On the other hand, the weight of the casing 4 can be sufficient in itself to keep the cable 8 taut. In particular this can be the case when the casing is made of concrete. Then the weight 7 is unnecessary.

In the presence of swell, the casing 4 undergoes a motion more or less approaching an ellipse, following the local conditions of current and swell. On a vertical axis, this motion becomes an alternating translation motion corresponding substantially to the vertical motion of the water surface 3. At the depth at which the casing 4 is immersed, the vertical component of the swell is strongly attenuated. This results in a translation motion of the casing 4 in relation to the water 3 and thus a flow of water in relation to the casing 4. Part of this flow passes through the housing of the casing 4 and encounters the rotor 5. The rotor 5 is arranged so as to be able to convert this flow into rotary kinetic energy. To this end, it comprises one or more blades arranged to convert the kinetic energy of translation of the water molecules into rotary kinetic energy of the rotor 5.

Figure 2:
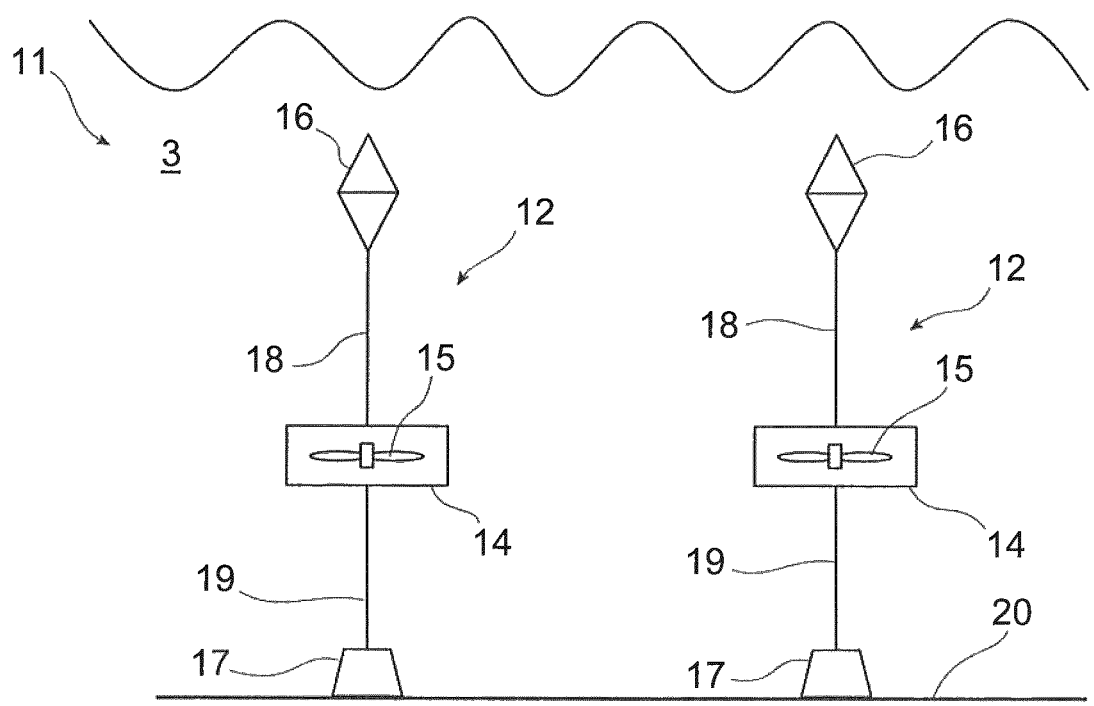
FIG. 2 schematically represents a second example of a field of devices for recovering the hydraulic energy of the swell according to the invention.

FIG. 2 schematically represents a second example of a field of devices for recovering the hydraulic energy of the swell according to the invention. This field 11 comprises two identical recovery devices 12 installed in the water 3. Each recovery device 12 also comprises a casing 14, a rotor 15, a float 16, a weight 17, a first cable 18 and a second cable 19. The casing 14 and the rotor 15 can be identical to the casing 4 and to the rotor 5 of the example of FIG. 1. The first cable 18 connects the float 16 to the casing 14 and the second cable 19 connects the casing 14 to the weight 17. In this second example, each recovery device 12 is arranged so that the float 16 is immersed in the water 3. The float is then protected from potentially destructive waves during storms and is invisible from the surface, which facilitates its integration in the environment. The force exerted by the weight 17 has to be greater than the force exerted by the float 16. The weight 17 then rests on the bottom 20. On the other hand, the cable 19 has to be sufficiently long to enable the casing 4 to move freely in relation to the bottom 20. It should be noted that the second cable 19 can be fixed directly to the bottom 20.

As for the first exemplary realisation, the casing 14 and the rotor 15 of each recovery device 12 in particular undergo a vertical alternating translation motion caused by the float 16. Being immersed to a depth greater than that of the float 16, they move relative to the water 3 in a vertical axis and make it possible to convert the flow of water passing through the casing 14 into rotary kinetic energy.

Figure 3:
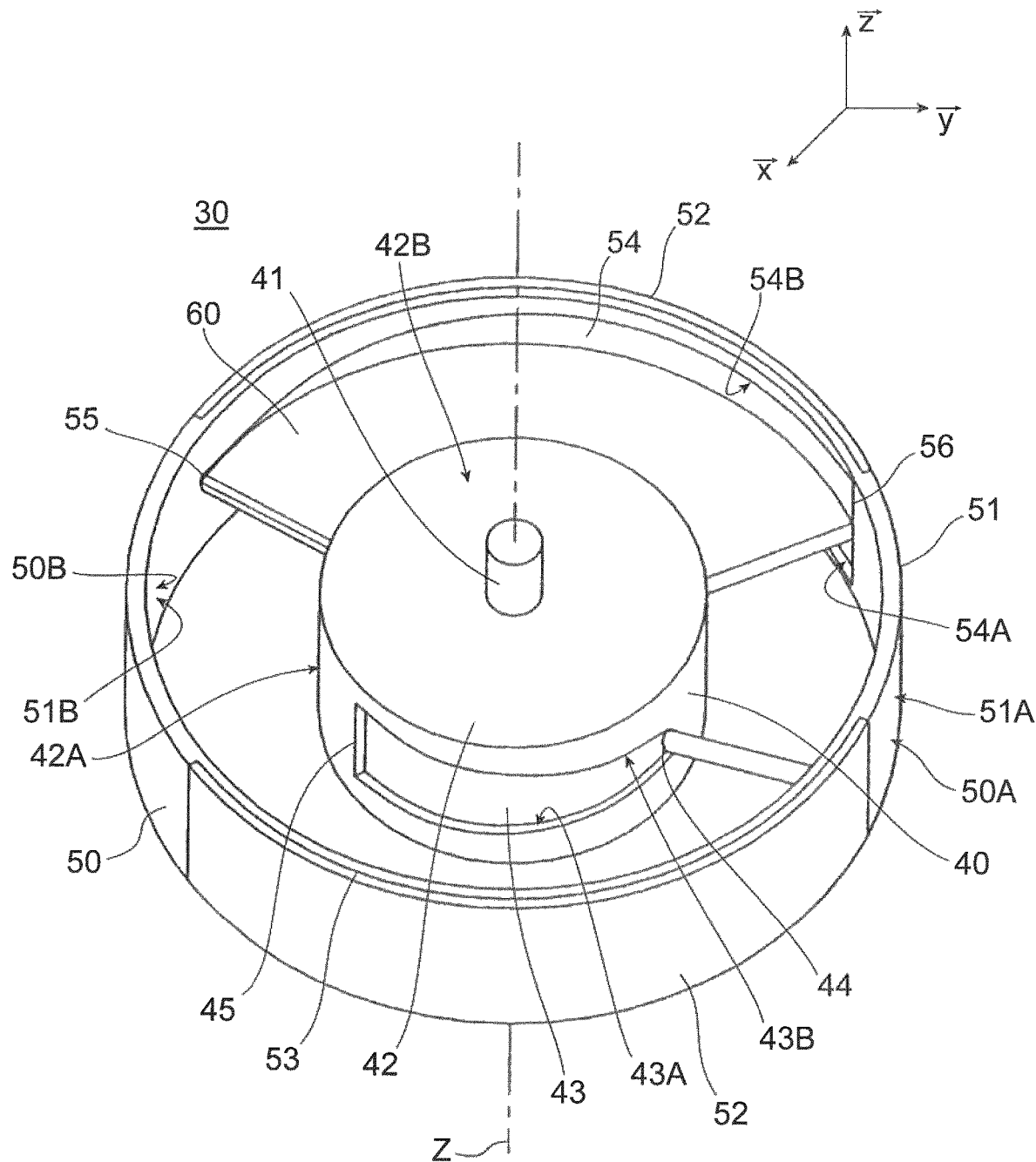
FIG. 3 represents, in a perspective view, a first example of a rotor according to the invention.

FIG. 3 schematically represents, in perspective view, a first example of rotor according to the invention for a device for recovering the hydraulic energy of the swell. The rotor 30 is designed to be mounted in rotation in a Z axis in a casing of a device for recovering hydraulic energy. It comprises a hub 40, a rim 50 and two deformable blades 60, one of the blades being represented only partially. The hub 40 comprises a shaft 41 and a hub body 42. The shaft 41 extends centrally on the body 42 in the Z axis. It is designed to be coupled to a generator, for example to the rotor of an electrical generator or hydraulic pressure generator. The hub body 42 overall has a cylinder of revolution shape. Radially it is delimited by an overall cylindrical outer surface 42A and extends in the Z axis between a bottom surface, not visible in the figure, and a top surface 42B. The hub body 42 also comprises two recesses 43 formed on its outer surface 42A, a single recess 43 being visible in the FIG. Each recess 43 is arranged to be able to receive an inner edge of a blade 60. It extends radially towards the inside from the outer surface 42A and extends axially between a bottom surface 43A and a top surface 43B. Each recess 43 extends circumferentially between an end 44 with low height and an end 45 with greater height. The two recesses 43 have axial symmetry between them in the Z axis.

The rim 50 overall has a cylinder of revolution shape around the Z axis. It has an outer surface 50A and an inner surface 50B each forming a cylinder of revolution. The rim 50 comprises a rim body 51 and two removable walls 52. The rim body 51 has an outer surface 51A and an inner surface 51B each forming a cylinder of revolution. It comprises two external recesses 53 formed on its outer surface 51A and extending radially towards the inside from this outer surface 51A. The external recesses 53 are arranged for each to be able to receive a removable wall 52 such that the rim 50 has a continuous outer surface 51A. The two external recesses 53 have axial symmetry between them in the Z axis. The rim body 51 also comprises two internal recesses 54 formed on its inner surface 51B, a single internal recess 54 being visible in the FIG. Each internal recess 54 is arranged facing an external recess 53. It is arranged to be able to receive an outer edge of a blade 60. It extends radially from the inner surface 51B to a bottom of the external recess 53 to form a through opening. Each internal recess 54 also extends axially between a bottom surface 54A and a top surface 54B and extends circumferentially between an end 55 with low height and an end 56 with greater height. The two internal recesses 54 have axial symmetry between them in the Z axis. Also, each internal recess 54 is positioned facing a recess 43 of the hub 42 and has a similar shape. In particular, the ends 44 and 55 of low height are positioned facing each other and the ends 45 and 56 with greater height are positioned facing each other. Each removable wall 52 comprises a shoulder with complimentary shape to the internal recesses 54, so as to be able to be inserted therein and to reshape a bottom for the internal recess 54. The removable walls 52 can be removed to allow access to the interior of the rim 50, and in particular to the blades 60.

Figure 4:
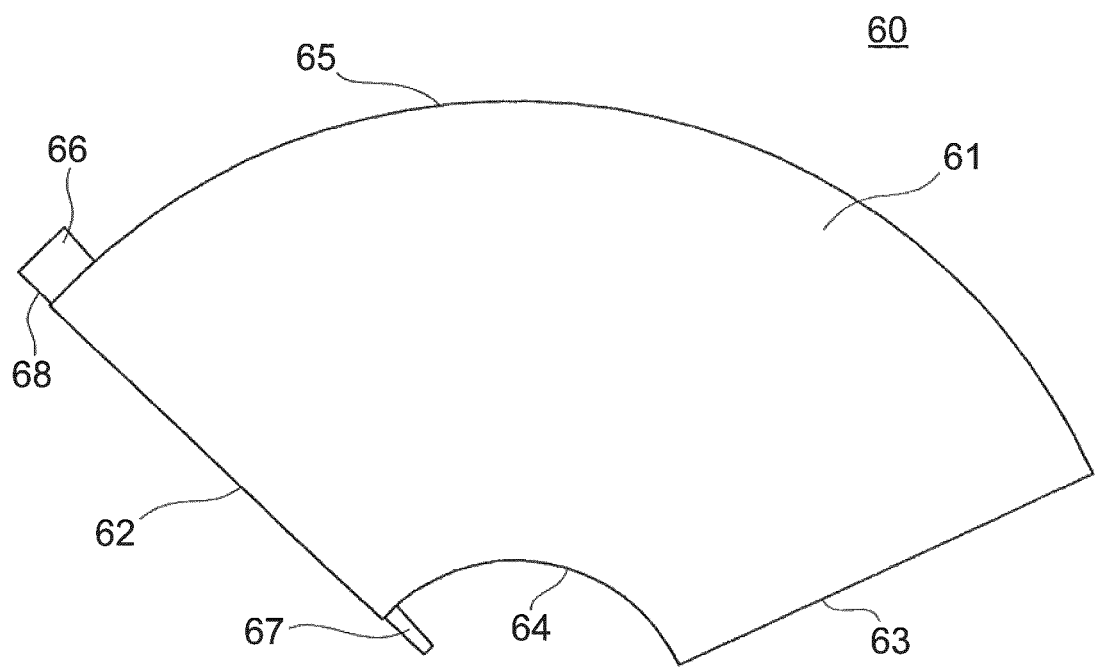
FIG. 4 represents, in a top view, a blade of the rotor of FIG. 3.

FIG. 4 represents, in a top view, one of the blades 60 of the rotor of FIG. 3. Each blade 60 comprises an annular sheet 61 formed in a flexible material, a leading edge 62, a trailing edge 63, an inner edge 64, and an outer edge 65. Each blade 60 further comprises a rod 66 at the leading edge 62 in order to strengthen the sheet 61. The inner edge of the blade 60 is housed in one of the recesses 43 of the hub 40 while the outer edge 65 of the blade is housed in the corresponding internal recess 54 of the rim 50. The rod 66, the leading edge 62 and the trailing edge 63 of each blade 60 extends between the hub 40 and the rim 50. The rod 66 comprises an inner end 67 radially projecting in relation to the inner edge 64 and an outer end 68 radially projecting in relation to the outer edge 65. Each end 67, 68 is inserted securely in an orifice formed in a recess of the hub and of the rim, respectively. The leading edge 62 can thus be held fixed to the hub and to the rim of the rotor. However, the rest of the blades are free to move in translation in the recesses 43 and 54. More precisely, the sheet 61 can move at its inner edge between the bottom surface 43A and the top surface 43B of the hub 40, and at its outer edge 65 between the lower surface 54A and the upper surface 54B of the rim 50. The bottom surface 43A and the top surface 43B of each recess 43 thus form a holding means for one of the blades 60. Similarly, the lower surface 54A and the upper surface 54B of each internal recess 54 form a holding means for one of the blades 60. The sheet 61 is for example constituted of a film, a fabric or nonwoven sheet. In particular it can comprise a material constituted of an elastomer, carbon fibre, poly-p-phenylene terephthalamide (known as Kevlar) or polyethylene terephthalate (known as Mylar). In particular, the sheet 61 can be constituted of a fabric of polyethylene terephthalate, a fabric formed from a mixture of poly-p-phenylene terephthalamide and polyethylene terephthalate, or again a film of polyethylene terephthalate strengthened with poly-p-phenylene terephthalamide. The sheet can also be formed by an elastomer or by a core of fabric covered on either side with an elastomer coating. When the blade comprises a rod and a fabric sheet, advantageously it can be arranged so that the fabric sheet forms an envelope for the rod. The sheet can then be mounted on the rotor simply by having it slide along the rod from its outer end.

Each end 67, 68 of the rod 66 is inserted securely in the hub 40 or in the rim 50. This secure fixing makes it possible to stiffen the rotor to prevent its deformation when it experiences the fluid flow. With such a fixing, the forces transmitted by each blade 60 to the rim 50 and tending to move it axially in relation to the hub 40 make the rod 66 work both in bending and in tension. The secure fixing is for example produced by welding, gluing, or by a screw-nut assembly. Advantageously, the secure fixing is produced by means of at least one conical half-shell mounted in the housing provided on the hub 40 or the rim 50 where the end 67 or 68 of the rod 66 is inserted. The use of conical half-shells facilitates removal and thus maintenance operations on the rotor.

It should be noted that the height of the rim 50 is greater than the height of the recesses 43 formed on the hub 40 and greater than the height of the internal recesses 54 formed on the rim 50. Consequently, whatever the configuration taken by the blades 60, these are protected from the currents and any transverse component of the swell.

Figure 5:
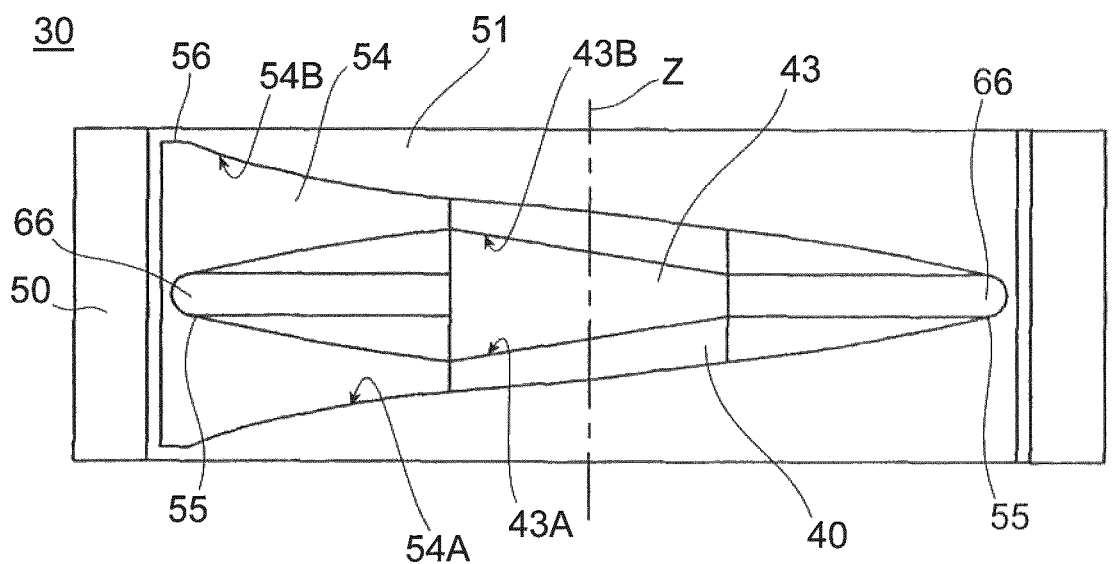
FIG. 5 represents the rotor of FIG. 3 in a top view with a removable wall removed.

FIG. 5 represents the rotor 30 of FIG. 3 in a top view. In this figure, one of the removable walls 52 is removed in order to view the interior of the rim 50. Similarly, each blade 60 is only illustrated by its rod 66, to facilitate viewing of the various recesses.

Figure 6:
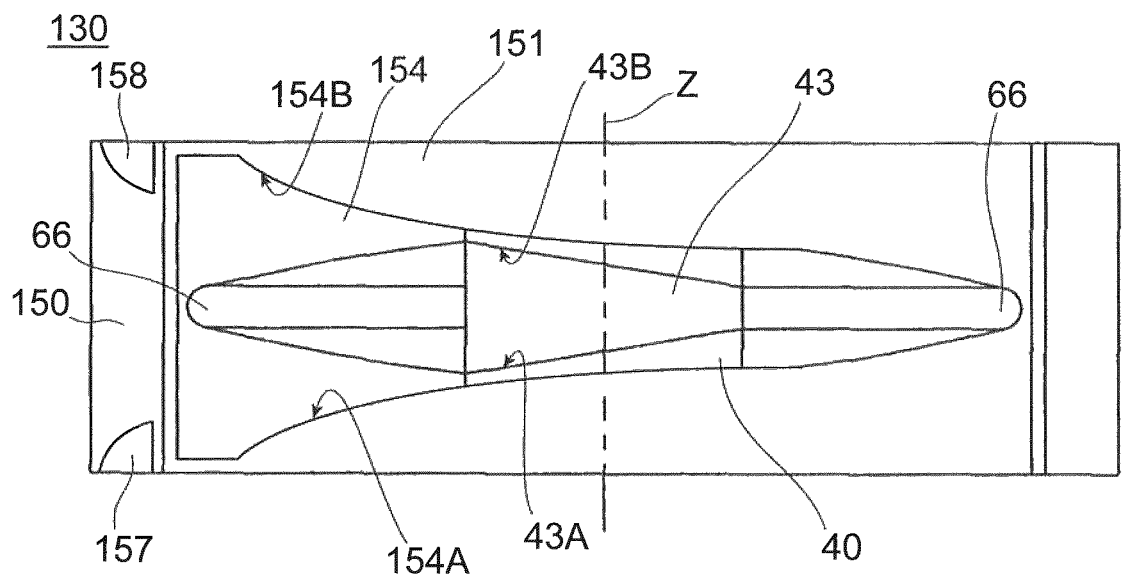
FIG. 6 represents, in a view similar to that of FIG. 5, a second example of a rotor according to the invention.

FIG. 6 represents, in a view similar to that of FIG. 5, a second example of a rotor according to the invention. The rotor 130 of this FIG. is uniquely distinguished from the rotor 30 of FIGS. 3 and 4 by its rim 150. The rim 150 is distinguished from the rim 50 by the profile of the bottom 154A and top 154B surfaces of the internal recess 154, and in that it comprises, furthermore, a discharge opening 157 arranged near the trailing edge of each blade when this is supported on the bottom surface 154A of the internal recess 154 and a discharge opening 158 arranged near the trailing edge of each blade when this is supported on the top surface 154B of the internal recess 154. The profile of the bottom 154A and top 154B surfaces creates a torsion of the blade ejecting the fluid radially outwards in the zone of the blade near the trailing edge. The discharge openings 157, 158 make it possible to discharge more easily part of the water flowing over the blade away from the rim 150. They make it possible to prevent the flow of water flowing to the outside of the rotor from being radially sucked towards the interior of the rotor and from disturbing the flow located downstream from the rotor. Such a phenomenon would cause backpressure downstream of the rotor which would reduce the performance of the conversion of the translational motion into rotation. On the contrary, the flow coming from the outside of the rotor causes the flow which tends to be ejected radially from the trailing edge, sucking it downstream from the rotor while channelling it, which improves the efficiency of the device.

Figure 7:
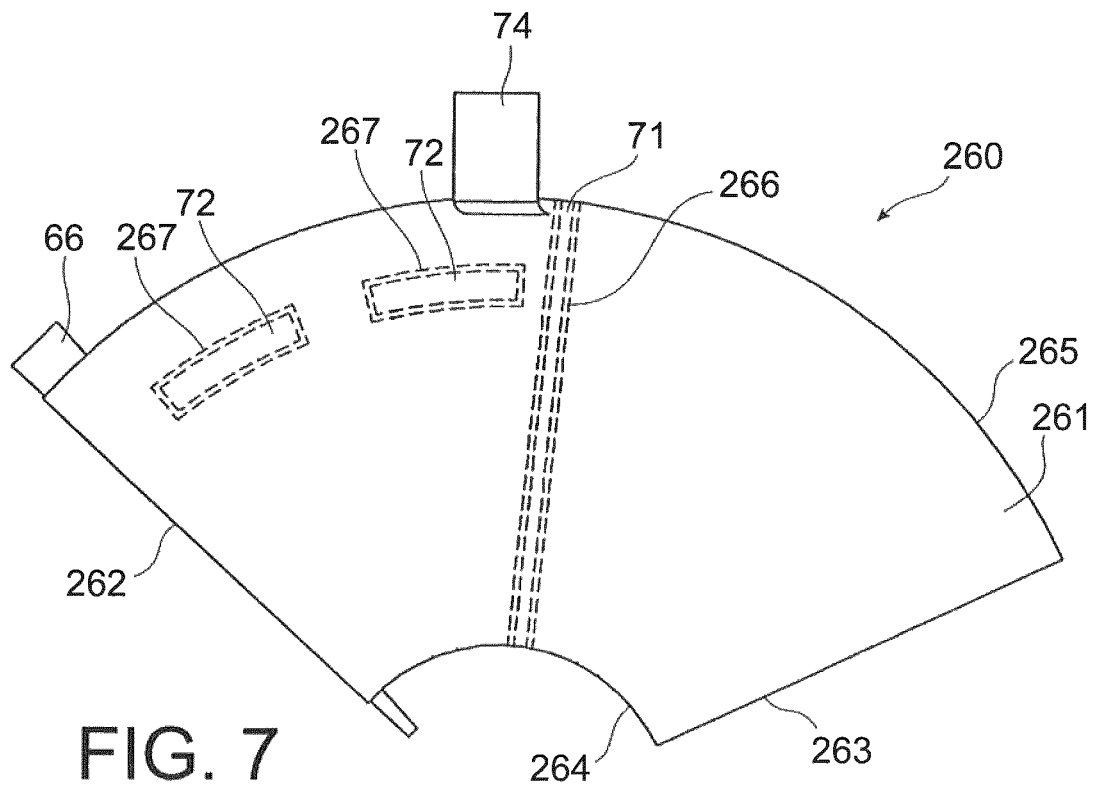
FIG. 7 represents, in a top view, a second example of blade of a rotor according to the invention.

FIG. 7 represents, in a top view, a second example of blade of a rotor according to the invention. In this realisation, the blade 260 comprises, in a similar way to the blades 60, an annular sheet 261, a leading edge 262, a trailing edge 263, an inner edge 264, an outer edge 265 and a rod 66. The annular sheet 261 is made of fabric, for example Mylar or Kevlar fabric. The blade 260 further comprises a radial stiffener 71, two stiffeners in circular arc 72 and one external peripheral fin 74. The radial stiffener 71 extends between the inner edge 264 and the outer edge 265. It is arranged centrally in relation to the circumference of the blade 260. The radial stiffener 71 comprises for example a batten inserted inside a housing 266 formed in the strip 261 of fabric. The batten is for example made of shape-memory alloy. The radial stiffener is preferably attached securely at each end to the hub and to the rim, thus making it possible to stiffen the rotor. Each stiffener 72 is arranged near the outer edge 265. It can also comprise a batten inserted inside a housing 267 formed in the strip of fabric. It should be noted that the number, arrangement and dimensions of the various types of stiffener can be adjusted according to the deformation desired for the blade and the force to be transmitted to the blade and the rest of the rotor. The peripheral fin 74 is arranged at the outer edge 265 of the blade 260. To simplify FIG. 7, the peripheral fin 74 is only represented for a limited portion of the periphery of the blade 260. The peripheral fin 74 nevertheless extends between the leading edge 262 and the trailing edge 263. Preferably it is made of a flexible material, for it to be able to be pressed against the inner surface 51B of the rim body 51. The peripheral fin 74 makes it possible to strengthen the tightness between the blade 260 and the rim 50. Advantageously, an inner peripheral fin is arranged in a similar way at the inner edge 264 of the blade 260. Advantageously these fins can be constituted of a series of successive tabs partially covering one another.

Figure 8A:
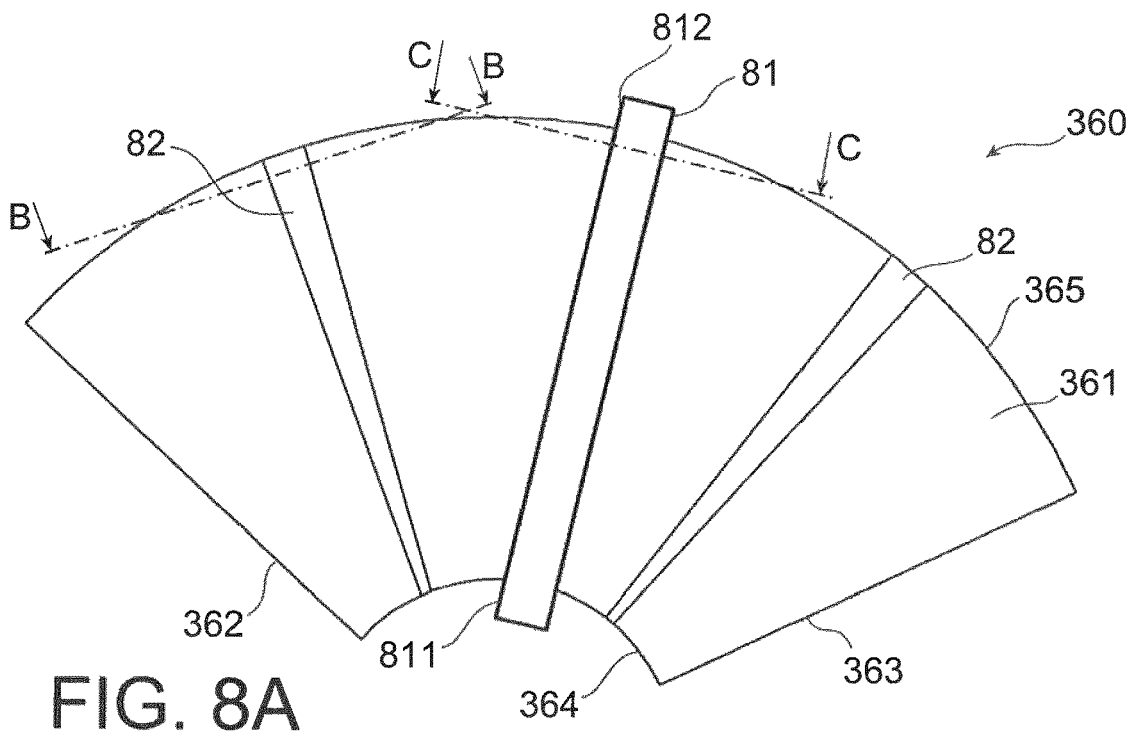
FIGS. 8A, 8B and 8C represent, in a top view, and in two cross-section views, a third example of blade of a rotor according to the invention.
Figure 8B:
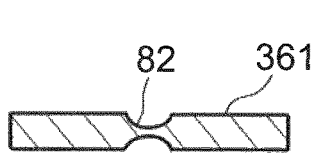
Figure 8C:
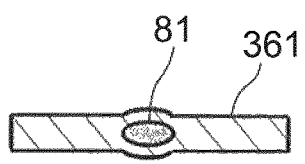
Figure 9:
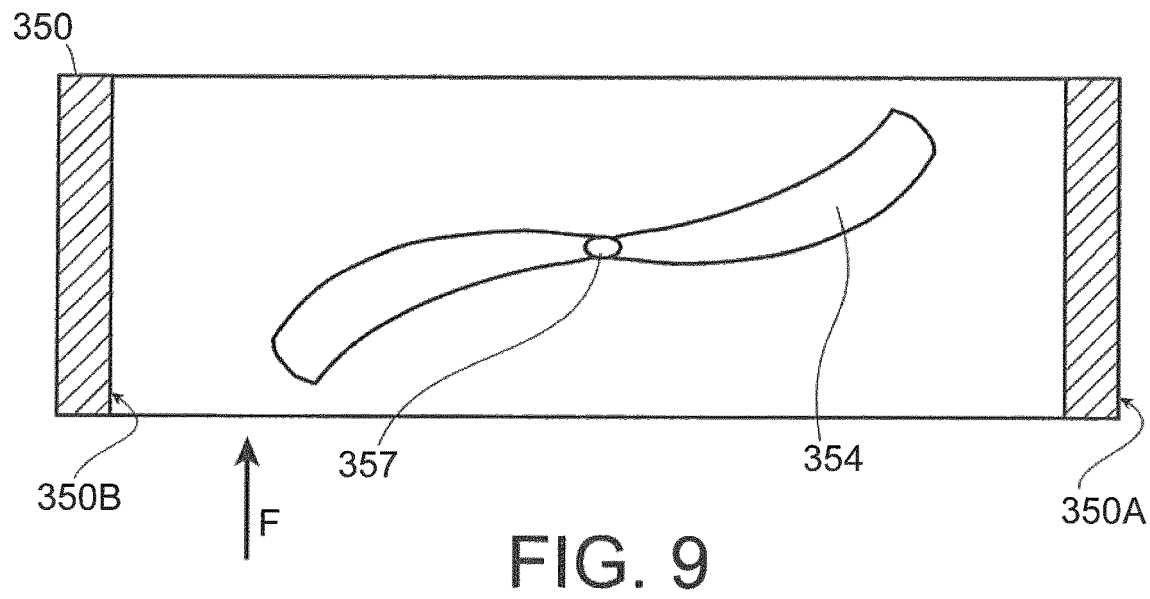
FIG. 9 represents, in a longitudinal section view, a rim of a third example of rotor according to the invention.

FIGS. 8 and 9 represent another example of rotor according to the invention. FIG. 8A represents, in a top view, a third example of blade of the rotor; FIGS. 8B and 8C represent the blade in two cross-section views in planes perpendicular to the radial direction; FIG. 9 represents, in a longitudinal section, an example of rim adapted to the blade of FIG. 8. In this exemplary realisation, the blade 360 comprises, in a way analogous to the blades 60 and 260, an annular sheet 361, a leading edge 362, a trailing edge 363, an inner edge 364, an outer edge 365. The annular plate 361 is made of elastomer. It can optionally be strengthened with a core, for example of Kevlar or Mylar fabric. The blade 360 further comprises a radial rod 81 and two bending zones 82. The rod 81 is arranged centrally in relation to the circumference of the blade 360. It comprises an inner end 811 projecting radially in relation to the inner edge 364 and an outer end 812 projecting radially in relation to the outer edge 365. The inner end 811 is inserted into an orifice formed in the hub of the rotor and the outer end 812 is inserted into an orifice 357, visible in FIG. 9, formed in the rim. As is visible in FIG. 8B, each bending zone 82 is formed by a local reduction of thickness of the plate 361. The rim 350 has an outer surface 350A and an inner surface 350B each forming a cylinder of revolution. It comprises two internal recesses 354 formed on its inner surface 350B, only one of these recesses being visible in FIG. 9. Each internal recess 354 is arranged to receive the outer edge 365 of a blade 360. As indicated above, the rim 350 further comprises two orifices 357 each able to receive the outer end 812 of a radial rod 81. Each orifice 357 divides an internal recess 354 into two parts having central symmetry between them in relation to the centre of the orifice 357. In this realisation, both the leading edge 362 and the trailing edge 363 are movable in relation to the rim 350 and to the hub. While the water flow passes through the rotor in the upward direction, the rotor turns anticlockwise viewed according to arrow F, the leading edge 362 effectively facing the flow of water. However, while the water flow passes through the rotor in the downward direction, the rotor turns clockwise viewed according to arrow F, the leading edge 362 and the trailing edge 363 then taking reversed roles. The rotor thus reverses its direction of rotation with each alternation of the vertical direction of the swell. It should be noted that the profile of the support surfaces of the internal recesses 354 can be non-symmetrical according to the direction of rotation of the rotor. The blade can thus have an absence of symmetry between its configuration in the upward direction of water flow and its configuration in the downward direction.

Figure 10:
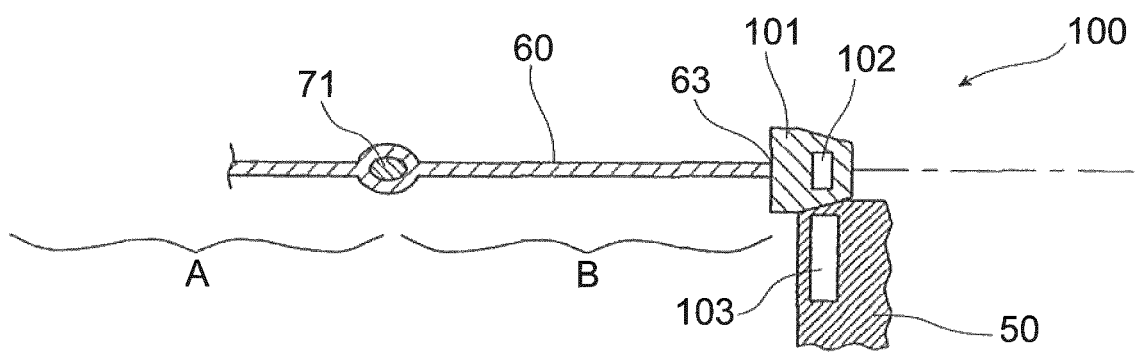
FIG. 10 represents, in a configuration of deformed blade, an example of an electromagnetic protective device equipping a rotor according to the invention.
Figure 11:
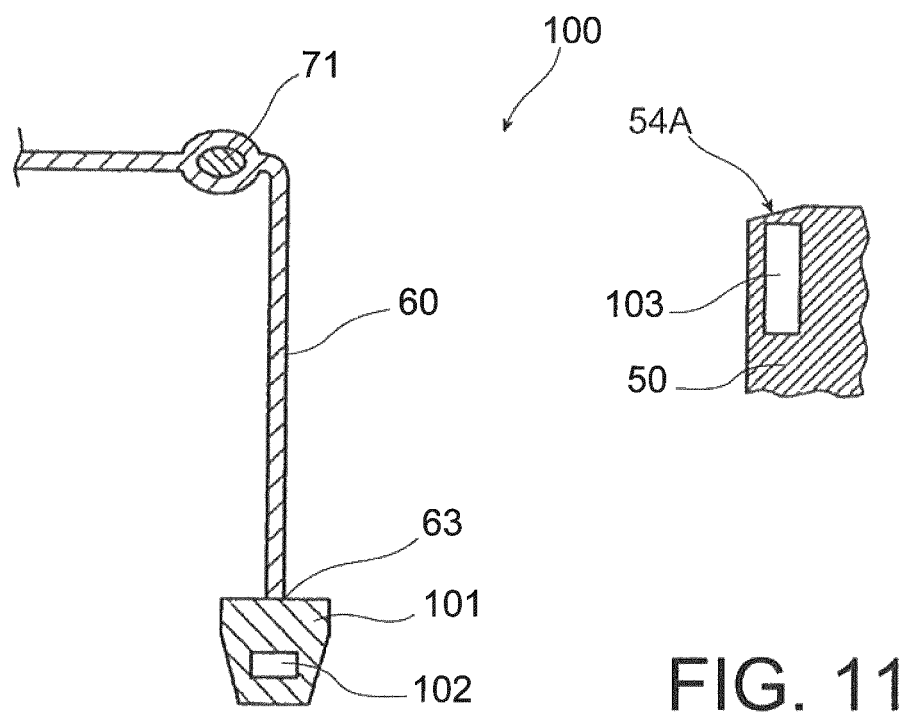
FIG. 11 represents the electromagnetic protective device of FIG. 10 in a secure configuration.

FIGS. 10 and 11 represent, in two different configurations, an example of an electromagnetic protective device 100 equipping a rotor according to the invention. FIG. 10 represents a part of a blade 60 and a rim 50 equipped with the protective device 100 in the deformed configuration and FIG. 11 represents the same elements in a secure configuration. The view of FIGS. 10 and 11 is a cross-section view in a plane perpendicular to the radial direction, this plane being near the outer edge of the blade 60. The blade 60 comprises a first radial stiffener 71 such as that described with reference to FIG. 7. The radial stiffener 71 delimits a first part A of the blade 60, located upstream, and a second part B, located downstream. The protective device 100 comprises a second radial stiffener 101 arranged at the trailing edge 63 of the blade 60 and a permanent magnet 102 mounted on the radial stiffener 101, near the outer edge of the blade 60. The permanent magnet 102 is preferably integrated inside the radial stiffener 101, in order to be isolated from the external environment. The protective device 100 also comprises an electromagnet 103 mounted in the rim 50 near a support surface 54A of the rim 50. The support surface 54A corresponds for example to the bottom surface of an internal recess 54 made in the rim 50. In any case, the support surface 54A is arranged near the trailing edge 63 of the blade 60 in its deformed configuration. When it is powered with electrical energy, the electromagnet 103 makes it possible to exert a force tending to hold the radial stiffener 101 pressed against the support surface 54A. The blade 60 can thus be held in the wanted deformed configuration. In the absence of electrical power supply, the radial stiffener 101 is no longer held on the support surface 54A. The blade 60 is then free to fold under the effect of the water flow, in particular at the part B, as illustrated in FIG. 11. Consequently, the rotor has much lower resistance to the flux of the water flow. The protective device 100 can be used when the speed of the flow is too strong. It can be coupled to a speed sensor of the flux or to a pressure sensor.

In a variant realisation, not represented, the protective device also comprises a second magnet mounted on the blade near its inner edge and its trailing edge, and a second electromagnet mounted on the hub near this second magnet when the blade is in its deformed configuration. In another variant realisation, not represented, the protective device comprises a radial stiffener near the trailing edge of the blade, a permanent magnet extending radially on all or part of the radial stiffener, a fixed radius extending between the hub and the rim and an electromagnet extending radially on all or part of the fixed radius. The fixed radius and the electromagnet are arranged so as to be located near the trailing edge of the blade while it is in its deformed configuration.

In a particular realisation, not represented, the part B of the blade 60 had reduced dimensions, so that its inner edge is flush with the outer surface 42A of the hub 42 and that its outer edge 65 is flush with the inner surface 50B of the rim 50. The part B of the blade can thus easily go from the operational configuration to the secured configuration under the effect of the water flow. To reset the rotor in its operational configuration, it can be envisaged to use an electromagnet capable of generating a relatively powerful magnetic field, so as to be able to exert a large recall force on the trailing edge 63, the electrical repowering of the electromagnet being sufficient to bring the blade into its deformed configuration and then to hold it in this configuration. The reverse flow can also suffice in certain conditions to bring the blade back into the operational configuration.

Figure 12:
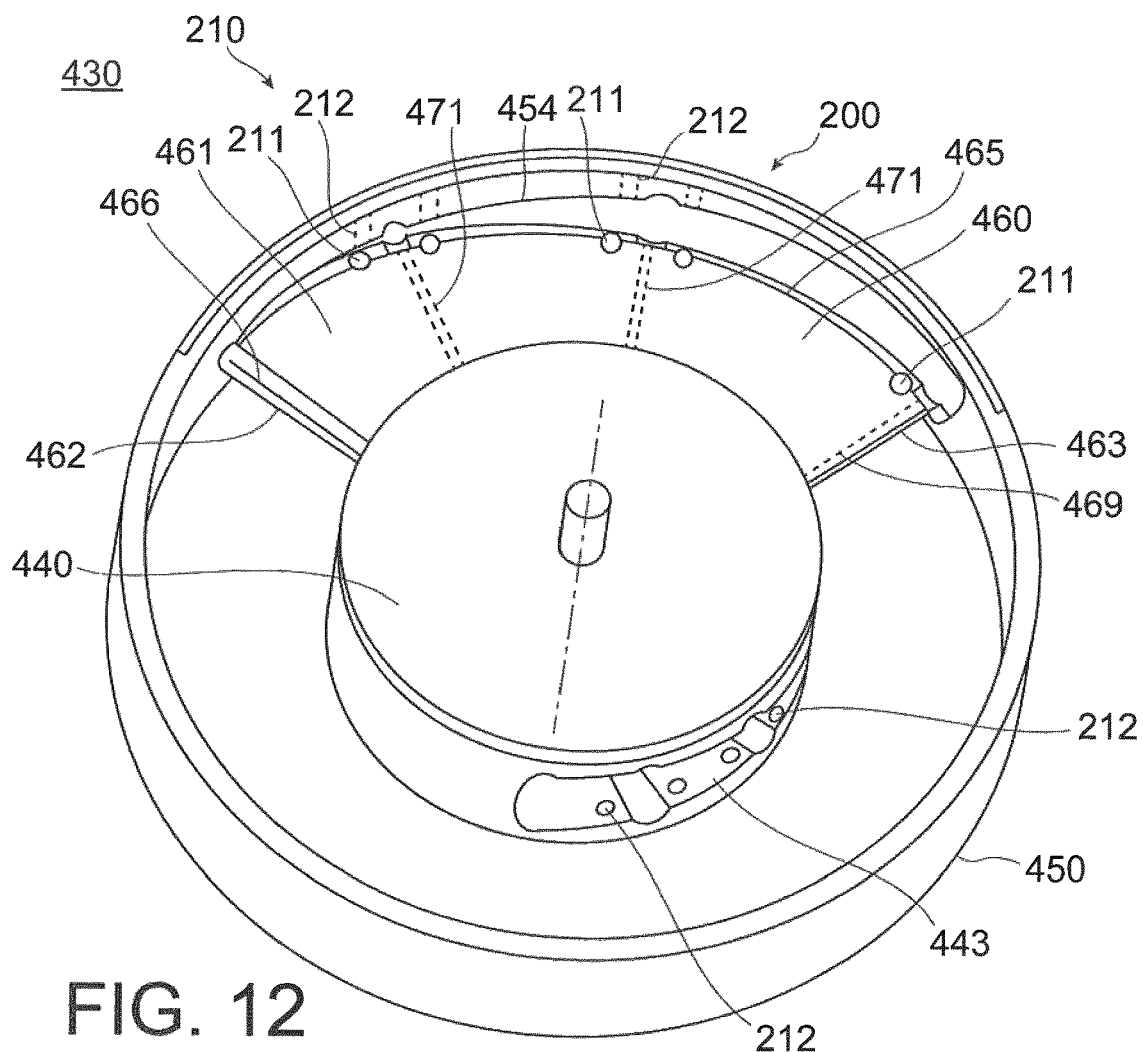
FIG. 12 represents an example of rotor equipped with a first example of control system for blade deformation.

FIG. 12 represents an example of a control system for deformation of the blades 200 equipping a rotor with two blades according to the invention. The rotor 430 comprises a hub 440, a rim 450 and three deformable blades 460, of which only one is visible in FIG. 12. The hub 440 is similar to the hub 40 of the example of rotor of FIG. 3. In particular it comprises three recesses 443 arranged to each receive an inner edge of a blade 460. The rim 450 is also similar to the rim 50 of the example of rotor of FIG. 3. In particular, it comprises three internal recesses 454 arranged to each receive an outer edge of a blade 460. Each blade 460 comprises an annular sheet 461 of fabric, a radial stiffener 466 at the leading edge 462 also serving as radius of the rotor, a radial stiffener 469 at the trailing edge 463 and two radial stiffeners 471. The radial stiffener 466 is fixed securely at a first end to the hub 440 and at a second end to the rim 450. The control system 200 comprises a plurality of groups of magnetic elements 210, each group of magnetic elements 210 comprising a permanent magnet 211 integral with the blade and two electromagnets 212 integral with the hub 440 or with the rim 450. In each group 210, the two electromagnets 212 are mounted on either side of a recess 443 of the hub 440 or on either side of an internal recess 454 of the rim 450. The permanent magnet 211 and the electromagnets 212 are arranged so that, in a first deformed configuration, the permanent magnet 211 is facing one of the electromagnets 212, and so that, in a second deformed configuration, the permanent magnet 211 is facing the other electromagnet 212 of the group 210. In the example of FIG. 12, the groups of magnetic element 210 are provided on either side of each of the radial stiffeners 466, at the level of the inner edge of the blade 460 and at the level of the outer edge 465 of the blade 460. Two other magnetic element groups 210 are provided near the radial stiffener 469, at the inner edge of the blade 460 and at its outer edge 465.

The control system for deformation of the blades 200 allows adjusting the shape of the blades 460 according to the fluid flow passing through the rotor 430. In particular, powering the electromagnets 212 can be controlled so that the blades 460 start to leave a deformed configuration with time lag in relation to the moment when the fluid flow changes direction. On the other hand, the electromagnets 212 can be controlled separately, so that, during certain time periods, the blades 460 keep a deformed configuration on one or more sections and leave this deformed configuration on one or more other sections. For example, in a first time period following the change from a down direction to an up direction of the fluid flow, the blades 460 can be in a deformed configuration, supported on a bottom surface of the recesses 443 and 454, all the electromagnets of the side of the bottom surfaces being powered. In a second time period, all these electromagnets remain powered, except the electromagnets 212 near the trailing edge 463. In a third time period, the electromagnets 212 near the trailing edge 463 and the electromagnets 212 around the radial stiffener 471 nearest the trailing edge 463 are not powered, the other electromagnets 212 of the side of the bottom surfaces remaining powered. In a fourth time period, none of the electromagnets 212 are powered. In a fifth time period, all the electromagnets 212 of the side of the top surfaces are powered. A similar control of the electromagnets 212 can be performed after the transition from the up direction to the down direction of the fluid flow. It should be noted that in each group 210, the electromagnets 212 can be powered so as to obtain one of the following three situations: the permanent magnet 211 is attracted by a first electromagnet 212 of the group and repelled by the second electromagnet 212, the permanent magnet 211 is attracted by the second electromagnet 212 of the group and repelled by the first electromagnet 212, the permanent magnet 211 is repelled simultaneously by the two electromagnets 212 of the group. The last situation allows holding the blades 460 in the predetermined configurations without the blades being supported on a surface.

Figure 13:
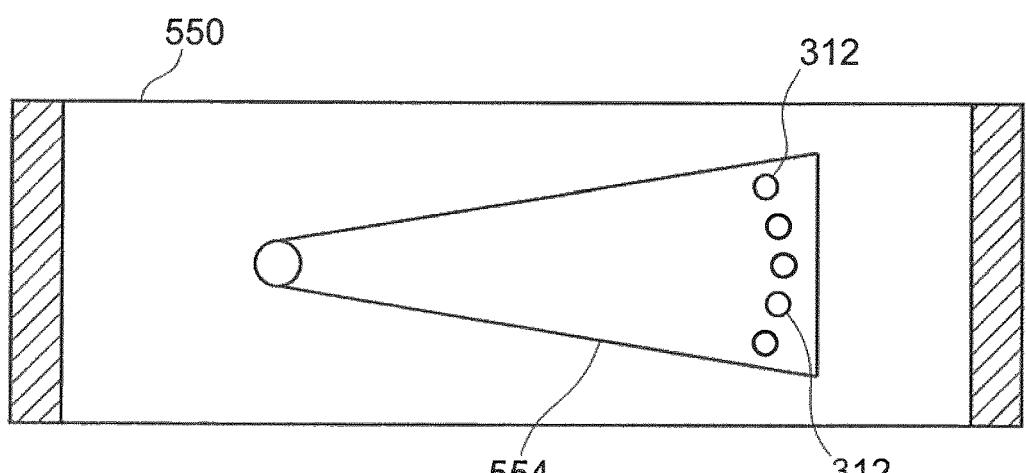
FIG. 13 represents, in a longitudinal section view, a rim of a rotor equipped with a second example of a control system for blade deformation.

FIG. 13 illustrates another example of control system of the deformation of the blades 300. In this figure, only the rim 550 is represented in longitudinal section view. The rim 550 comprises internal recesses 554 arranged to each receive an outer edge of a blade. The control system 300 comprises a permanent magnet mounted on each blade, near the trailing edge and the outer edge of the blade. It further comprises, for each internal recess 554, a set of electromagnets 312 mounted in the radial thickness of the rim 550 and arranged so as to be able to attract the permanent magnet, repel it or exert no action, according to their powering. Analogously, a second permanent magnet can be mounted on each blade, near the trailing edge but on the side of the inner edge of the blade, and the sets of electromagnets can be mounted on the hub, near the recesses receiving the inner edge of a blade.

Thus, by controlling the power supply of the electromagnets 312, it is possible to compel the permanent magnet to approach one of the electromagnets and thus to compel the blade to take a corresponding configuration. The electromagnets can be powered successively so that the blade changes from the first deformed configuration to the second deformed configuration while being successively held in different intermediate configurations. Control of the powering of the electromagnets can be ensured sequentially or gradually/progressively. In the case of a sequential power supply, one single electromagnet is powered at a time. In the case of a progressive/gradual power supply, two neighbouring electromagnets are powered simultaneously, for example inversely in proportion, so as to gradually move the magnet from one of the electromagnets to the other neighbouring electromagnet.

For illustrative purposes, each pair of permanent magnets and electromagnets of a protective system or a control system can be arranged to exert an electromagnetic force greater than or equal to 3000 newton (N). Such a force is suited to a rotor having a diameter of approx. 3 metres and comprising three blades covering overall approx. 83% of the swept area and turning at 25 revs per minute. In this case, the axial thrust is approx. 29,000 N, i.e. approx. 9,700 N per blade.

The examples of rotor described with reference to FIGS. 3 to 11 are suited to use in a device for recovering the hydraulic energy of the swell as described with reference to FIGS. 1 and 2. Moreover, any combination of examples or variants of realisation can be envisaged without departing from the scope of the invention as defined in the claims.

The invention claimed is:

1. A rotor for a device for recovering hydraulic energy of a swell occurring in a liquid medium, the rotor comprising a rim, a hub mounted inside the rim and securely with the rim and a blade extending radially between the hub and the rim, the blade being deformable under the effect of flow of the liquid medium and the rotor comprising a holding body arranged to hold the blade in a first deformed configuration for a flow of the liquid medium in a first direction.

2. The rotor according to claim 1, wherein the blade comprises a leading edge and a trailing edge each extending radially between the hub and the rim.

3. The rotor according to claim 2, wherein the holding body is arranged to hold the trailing edge of the blade.

4. The rotor according to claim 1, wherein the blade comprises an outer edge, the holding body comprising a support surface formed on the rim so that the outer edge of the blade can be supported thereon during the deformation of the blade in the first deformed configuration.

5. The rotor according to claim 1, wherein the blade comprises an inner edge, the holding body comprising a support surface formed on the hub and configured to support the inner edge of the blade thereon during the deformation of the blade in the first deformed configuration.

6. The rotor according to claim 1, wherein the blade comprises a leading edge and a trailing edge, each extending radially between the hub and the rim, and the holding body is arranged so that the blade has a helical slope increasing as it approaches the trailing edge.

7. The rotor according to claim 1, wherein the holding body is arranged so that the blade is twisted in the first deformed configuration.

8. The rotor according to claim 1, wherein the holding body comprises a recess formed on the hub and/or a recess formed on the rim.

9. The rotor according to claim 1, wherein the holding body comprises a protrusion formed on the hub and/or a protrusion formed on the rim.

10. The rotor according to claim 1, wherein the rim comprises a rim body and a removable wall, the rim body comprising an opening for accessing the blade, and the removable wall being arranged to close the opening.

11. The rotor according to the claim 10, wherein the blade comprises an outer edge, the holding body comprises a support surface formed on the rim so that the outer edge of the blade can be supported thereon during the deformation of the blade in the first deformed configuration, and the support surface is formed on the removable wall.

12. The rotor according to claim 1, wherein the rim comprises a discharge opening arranged near a trailing edge of the blade when the blade is in the first deformed configuration.

13. The rotor according to claim 1, wherein the rim has a height, along the axis of rotation of the rotor, greater than the deflection of the blade along the axis of rotation of the rotor.

14. The rotor according to claim 1, wherein the holding body is arranged such that in the first deformed configuration, a trailing edge of the blade extends between the hub and the rim in a direction forming an angle less than or equal to 30°, with a plane perpendicular to an axis of rotation of the rotor.

15. The rotor according to claim 1, wherein the blade comprises a fabric sheet, a non-woven sheet, a thermoplastic film, and/or an elastomer plate.

16. The rotor according to claim 1, wherein the blade comprises a radial stiffener, an ortho-radial stiffener, and/or a circular arc stiffener.

17. The rotor according to the claim 16, wherein the radial stiffener, the ortho-radial stiffener, and/or the circular arc stiffener is made in a shape-memory alloy.

18. The rotor according to claim 1, wherein the blade comprises an articulation extending between the hub and the rim, to allow deformation of the blade.

19. The rotor according to claim 1, wherein the blade comprises a peripheral fin extending from an outer edge of the blade and able to be pressed against the rim, and/or a peripheral fin extending from an inner edge of the blade and able to be pressed against the hub.

20. The rotor according to claim 1, wherein the holding body comprises a first magnetic element mounted on the rim or on the hub and a second magnetic element mounted on the blade, the magnetic elements being arranged to hold the blade in the first deformed configuration.

21. The rotor according to claim 1, wherein the holding body is also arranged to hold the blade in a second deformed configuration for a flow of the liquid medium in a second direction.

22. The rotor according to claim 1, wherein the blade comprises a leading edge fixed in relation to the hub and to the rim.

23. The rotor according to the claim 21, wherein the blade comprises a fixed central zone between a leading edge and a trailing edge of the blade, the fixed central zone extending between the hub and the rim and being secure with the hub and the rim, the leading edge and the trailing edge both being mobile in relation to the hub and to the rim, the holding body being arranged such that both the trailing edge and the leading edge of the blade are able to be held in the first deformed configuration for a liquid medium flow in the first direction, and such that both the trailing edge and the leading edge of the blade are able to be held in the second deformed configuration for a liquid medium flow in the second direction.

24. The rotor according to claim 1, wherein the holding body comprises a set of magnetic elements arranged, on the one hand, on the blade and, on the other hand, on the rim and/or the hub, to allow the blade to be held in different configurations.

25. The rotor according to the claim 24, wherein the holding body comprises a plurality of magnetic element groups distributed circumferentially, each group comprising a first magnetic element mounted on the blade and a second magnetic element mounted on the rim or on the hub, the first magnetic element and the second magnetic element of each group being arranged to interact with each other.

26. The rotor according to claim 24, wherein the holding body comprises a permanent magnet mounted on the blade and a group of electromagnets mounted on the rim or on the hub, the permanent magnet and the electromagnets arranged so that the permanent magnet is configured to interact with each electromagnet.

27. The rotor according to claim 24, comprising a sensor capable of measuring a property of the liquid medium flow and a control device able to control the magnetic elements as a function of the property of the liquid medium flow.

28. The rotor according to claim 1, wherein the holding body comprises an end abutment made of shape-memory alloy, the end abutment comprising a first end fixed to the rim or the hub, all or part of the rest of the end abutment being able to act as a support surface for the blade, the end abutment being able to take two stable configurations corresponding to two separate positions of the non-fixed part.

29. A device for recovering hydraulic energy of the swell occurring in a liquid medium, said recovery device comprising:
   a rotor according to claim 1, and
   a casing comprising a through housing arranged to receive the rotor.

30. The device for recovering the hydraulic energy of the swell according to the claim 29, comprising a float and a cable connecting the casing to the float.

31. The device for recovering the hydraulic energy of the swell according to the claim 29, comprising a first cable connecting the casing to a bottom of the liquid medium, a float and a second cable connecting the casing to the float.

32. A field of devices for recovering the hydraulic energy of the swell, comprising a plurality of devices for recovering the hydraulic energy of the swell according to claim 29.

\* \* \* \* \*